United States Patent
Yau et al.

(10) Patent No.: US 7,434,084 B1
(45) Date of Patent: Oct. 7, 2008

(54) METHOD AND APPARATUS FOR ELIMINATING SAMPLING ERRORS ON A SERIAL BUS

(75) Inventors: Cornel Yau, San Jose, CA (US); John Ly, Milpitas, CA (US); Tong Tang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 11/076,760

(22) Filed: Mar. 10, 2005

(51) Int. Cl.
  *H04L 7/02* (2006.01)
(52) U.S. Cl. ............... 713/600; 713/375; 713/400; 375/354; 375/355; 375/360
(58) Field of Classification Search ........... 713/375, 713/400, 600; 375/354, 355, 360
  See application file for complete search history.

(56) References Cited

U.S. PATENT DOCUMENTS

| | | | | |
|---|---|---|---|---|
| 5,708,801 A | * | 1/1998 | Williams et al. ............ 713/400 |
| 6,549,595 B1 | * | 4/2003 | Den Besten et al. ......... 375/360 |
| 6,718,487 B1 | * | 4/2004 | Sommer ..................... 714/42 |
| 7,171,321 B2 | * | 1/2007 | Best ........................... 702/106 |
| 7,180,949 B2 | * | 2/2007 | Kleveland et al. ........... 375/256 |
| 7,324,564 B2 | * | 1/2008 | Wu et al. .................... 370/535 |
| 2007/0109908 A1 | * | 5/2007 | Best ........................... 365/233 |

OTHER PUBLICATIONS

Agere Systems, Synchronous Bit-Serial Data Interface Timing, Application Note, May 21, 2004, Agere Systems Inc, Allentown, PA: <http://www.eetasia.com/ARTICLES/2004DEC/A/2004DEC16_ID_AN01.pdf>.

* cited by examiner

*Primary Examiner*—Abdelmoniem Elamin
(74) *Attorney, Agent, or Firm*—Charles E. Krueger

(57) ABSTRACT

A synchronous bit-serial data interface utilizes a transmitter that transmits a data stream having duplicates of each data bit. The receiver samples the data stream utilizing either the rising or falling edge of a received clock signal. If the rising edge is utilized the first duplicated bit is discarded and if the falling edge is utilized the second duplicated bit is discarded. The system allows transmitter/receiver pairs of devices that sample and latch data on the same clock edge to communicate.

4 Claims, 5 Drawing Sheets

METHOD AND APPARATUS FOR ELIMINATING SAMPLING ERRORS ON A SERIAL BUS

BACKGROUND OF THE INVENTION

A card inserted in a device, such as a router, utilizing a PCI backplane, must be configured and assigned specific resources in the backplane such as "ID select" lines, IRQs, memory regions, and DMA channels. Additionally, a card may include a non-volatile memory, sometimes called a "cookie", that holds information about the card and must be queried by the host.

One example of an interface for performing these functions is the Serial Peripheral Interface (SPI) bus, which is a serial bus for eight and sixteen bit data transfer operations. As depicted in FIG. 1A, there are a separate data lines for transmission and reception, and a device coupled to the bus may be a transmitter or a receiver. The devices connected to the SPI bus may be classified as Master or Slave. A Master device initiates an information transfer on the bus and generates clock and control signals. A Slave device is controlled by a Master through a slave select (chip enable) line. Generally, a dedicated select line is required for each slave device.

The SPI protocol allows a transmitter to latch/change data on either the rising or falling clock edge and allows a receiver to sample data on either the rising or falling clock edge. Generally, data is sampled at the receiver by a clock edge opposite to the clock edge used to latch/change data at the transmitter to maximize the tolerance for timing edges.

In practice, different manufacturers have implemented the SPI interface with different latching/sampling schemes. Some have latched on the rising edge and sampled on the falling edge and vice versa. A system implementing one scheme will not be compatible with a system implementing another scheme.

The challenges in the field of communications continue to increase with demands for more and better techniques having greater flexibility and adaptability. Therefore, a need has arisen for a new system and method for allowing compatibility between different SPI implementation schemes.

In accordance with various embodiments of the present invention, a system and method for transferring data between devices coupled to an SPI bus is provided that addresses disadvantages and problems associated with previously developed systems and methods.

BRIEF SUMMARY OF THE INVENTION

In one embodiment of the invention, a system and method allows a transmitter and receiver that latch and sample, respectively, on the same clock edge to communicate over the synchronous bit serial interface.

In another embodiment of the invention, a transmitter transmits a data stream having duplicates of each data bit. The receiver samples the data stream utilizing either the rising or falling edge of a received clock signal. If the rising edge is utilized the first duplicated bit is discarded and if the falling edge is utilized the second duplicated bit is discarded.

Other features and advantages of the invention will be apparent from the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1A:
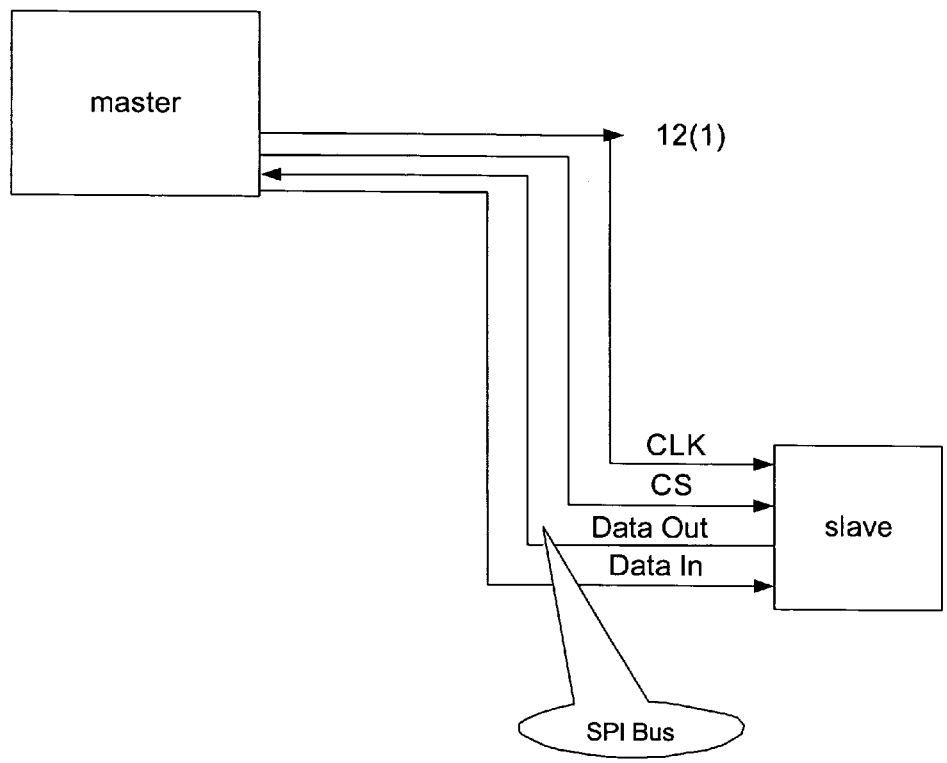
FIG. 1A is a block diagram of the SPI bus.
Figure 1B:
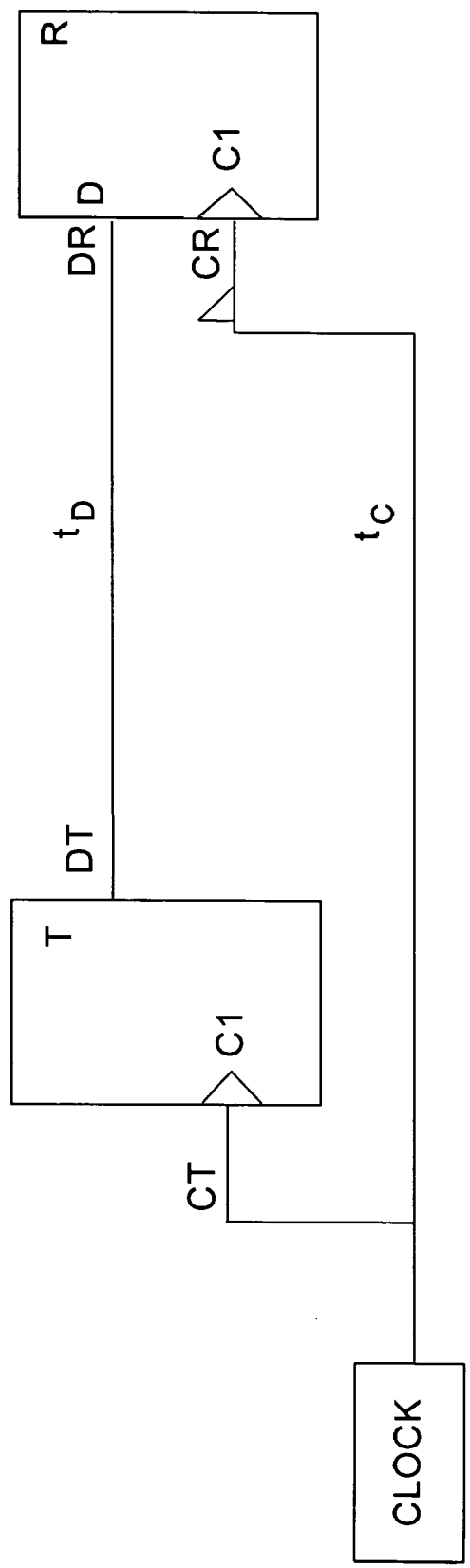
FIG. 1B is a block diagram of a transmit channel.

FIG. 1B is a block diagram depicting a technique for implementing bit-serial transmission between the transmitter and receiver. In a synchronous system the same clock is utilized for latching data at the transmitter and sampling data at the receiver.

Figure 2:
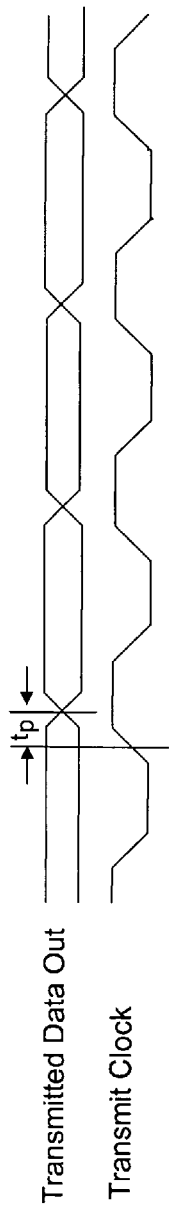
FIG. 2 is a timing diagram depicting the transmitted signal and transmit clock.

FIG. 2 depicts the transmitted data and the transmit clock, where in this example the data is latched on the rising edge of the clock. The delay between the rising edge of the clock and the generation of the transmitted bit is the propagation delay. As is apparent from FIG. 2, the transmitted signal is unstable near the rising edge of the clock.

Figure 3A:
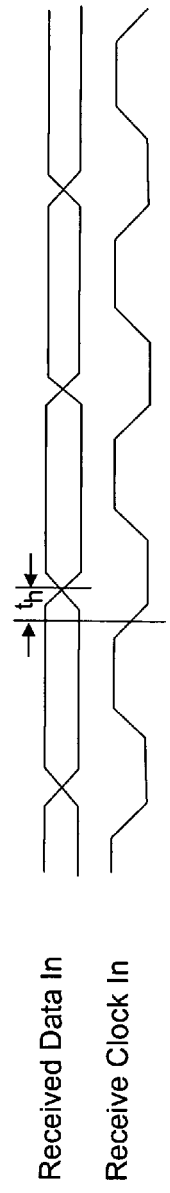
FIGS. 3A and, 3B are timing diagrams depicting the received signal and receive clock.
Figure 3B:
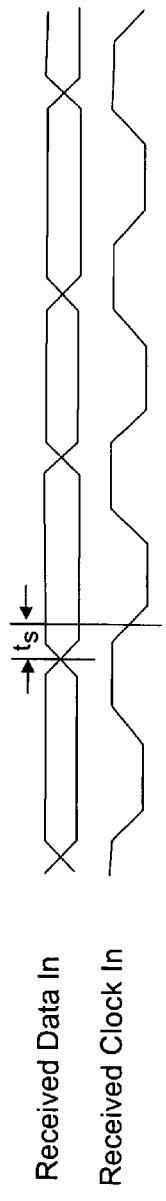

FIGS. 3A and 3B depict the received data and receive clock, where in this example, the data is sampled at the falling edge of the clock. As depicted in FIG. 3A, accurate sampling of the data requires that the signal must be stable at the receiver for minimum hold time after the data is sampled and, as depicted in FIG. 3B, accurate sampling of the data requires that the signal be stable for a minimum set up time at the receiver.

Referring back to FIG. 2, it is clear that if the data were both latched and sampled on the rising edge of the clock there would not be sufficient set up time at the receiver. Also, if data were both latched and sampled on the falling edge of the clock there would not be sufficient hold time at the receiver. This problem is avoided in existing systems by sampling on the clock edge opposite to the clock edge utilized for latching.

Accordingly, if a host queried a card where both the host controller latched data on a clock edge and the card controller sampled data on the same clock edge the card would be incompatible with the host. A first embodiment of the invention will now be described that allows compatibility between all types of transfers.

There are four possible scenarios:
1. Tx latches on rising edge, Rx samples on rising edge;
2. Tx latches on rising edge, Rx samples on falling edge;
3. Tx latches on falling edge, Rx samples on rising edge;
4. Tx latches on falling edge, Rx samples on falling edge.

As described above, scenarios 2 and 3 are required for accurate data sampling. However, if the host uses a controller designed to implement scenario 2 and the card uses a controller designed to implement scenario 3, then the problem scenarios 1 and 4 can result.

The presently described embodiment of the invention utilizes a double data bit scheme to overcome this problem presented by scenarios 1 and 4. This scheme provides a duplicate bit for each bit of the data so that two bytes must be transmitted to transmit one byte of data. Although the throughput of the bus is reduced by the scheme, generally high bandwidth is not required by control buses such as SPI so that the reduction of bandwidth is not of concern.

In one embodiment, the following algorithm is used. If the receiver samples data at the rising edge of the clock then it discards the odd bit (first bit) of the duplicated data and if the receiver samples data on the falling edge of the clock it will discard the even bit (second bit) of the duplicated data.

For example, if one data byte's value is 0x5A (01011010), the transmitter will send the two data bytes 0x33 and 0xCC (00110011 11001100).

The sampling operation for both the rising edge and falling edge of the clock will now be described with reference to FIGS. 4 and 5.

Figure 4:
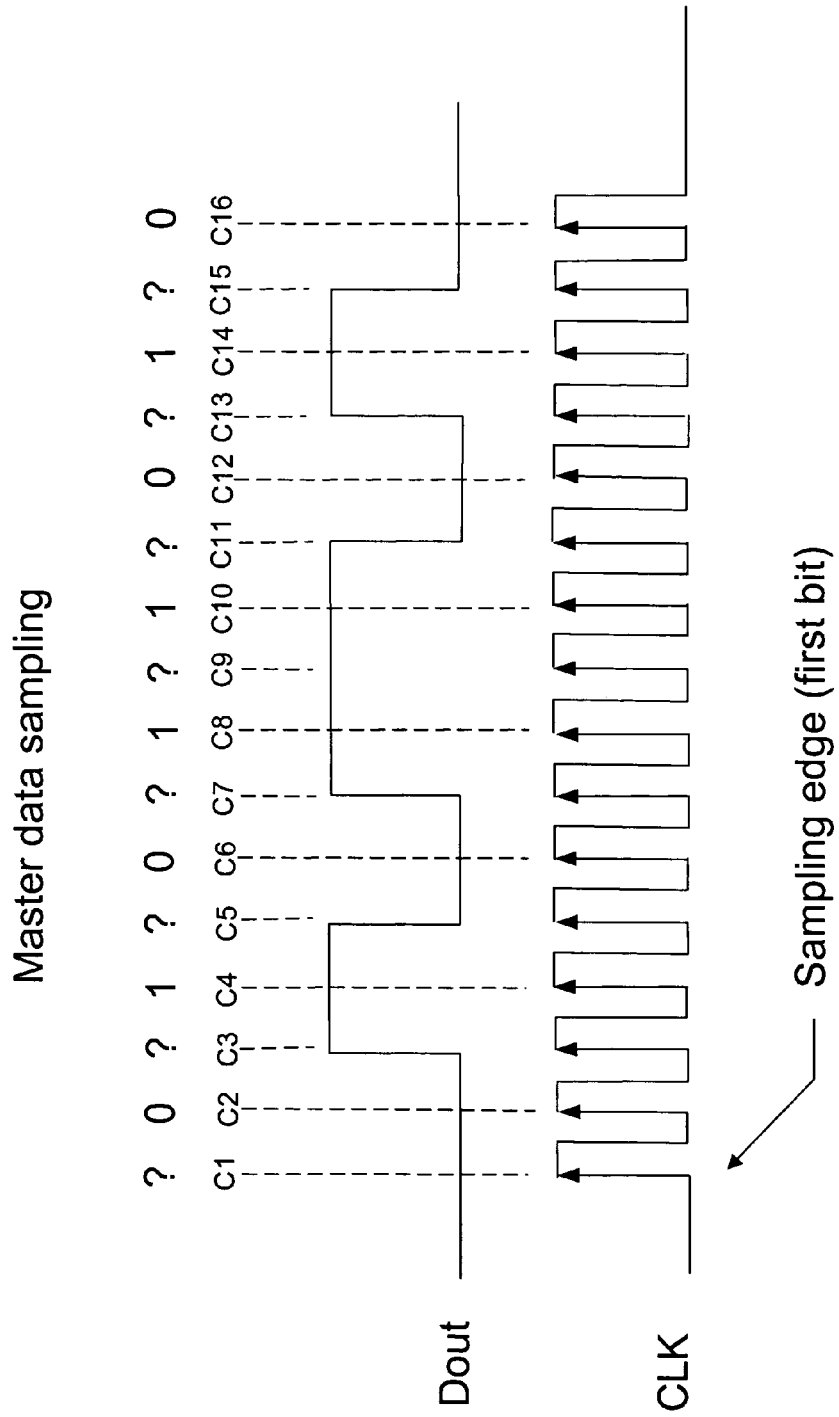
FIG. 4 is a timing diagram depicting sampling on the rising clock edge.

In FIG. 4 the receiver samples the data on the rising edge and the transmitter changes the data on the rising edge. Thus, according to the algorithm, the receiver will discard the first bit and save the second bit of duplicated data.

The operation of the algorithm to assure accurate sampling is illustrated in FIG. 4. For the duplicated "1" at clocks c3 and c4 it is clear that the duplicated first bit at clock c3 is not stable when sampled at c3 because there is no set up time to allow the signal to be properly sampled. However, at clock c4 the signal is stable and can be sampled. Thus, by discarding the first bit sampled at c3 the algorithm allows a receiver and transmitter that sample and latch on the same clock edge to be compatible without introducing data errors.

Figure 5:
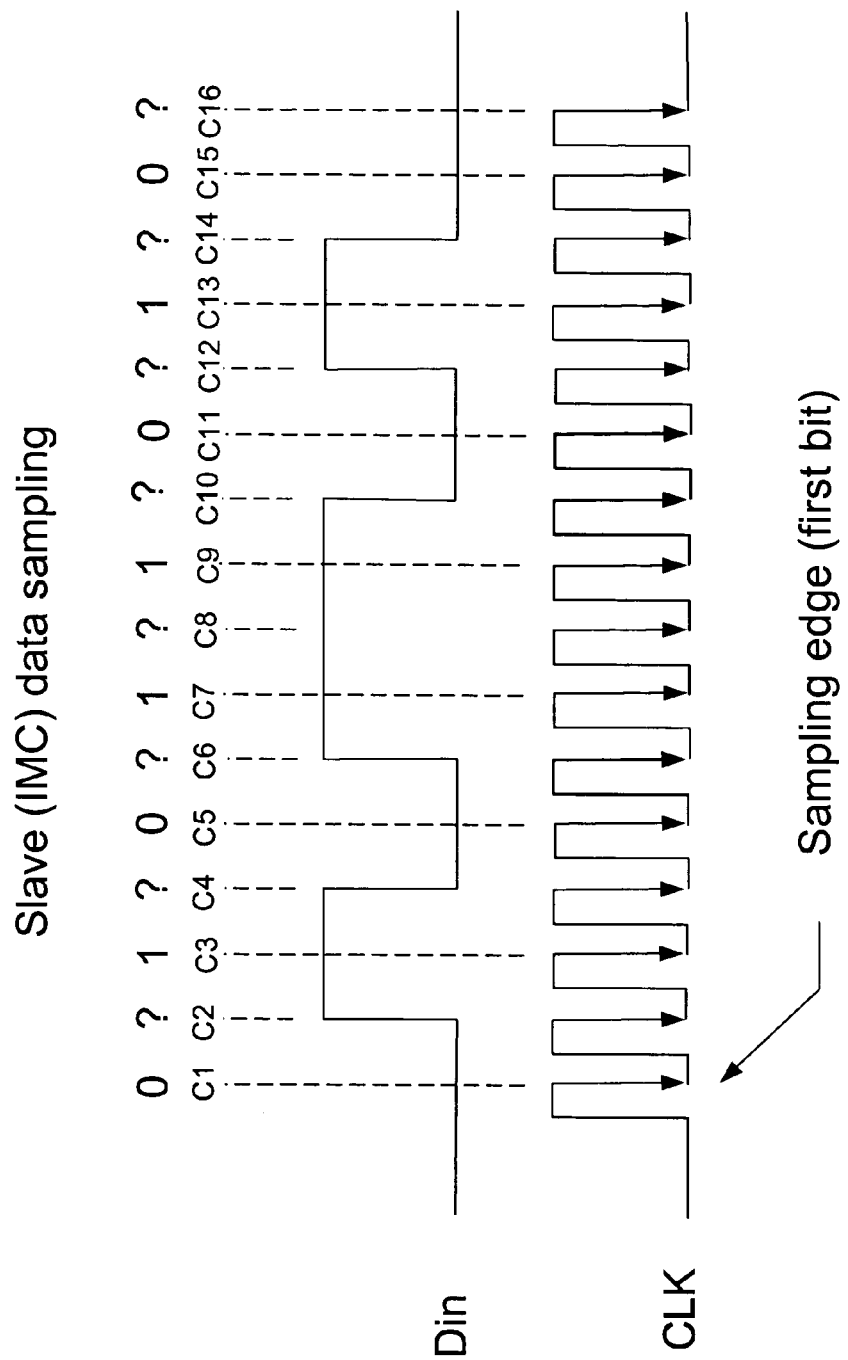
FIG. 5 is a timing diagram depicting sampling on the falling clock edge.

In FIG. 5 the receiver samples the data on the falling edge and the transmitter latches the data on the falling edge. Thus, according to the algorithm the receiver will discard the second bit and save the first bit of duplicated data.

In this example, the duplicated "1" at c3 and c4 is sampled on the falling edges of c3 and c4. The instability of the sampling at c4 is due to the lack of sufficient hold time of the signal after sampling. However, the signal sampled c3 has sufficient hold time and can be accurately sampled.

Thus, by discarding the second bit sampled at c4 the algorithm allows a receiver and transmitter that sample and latch on the same clock edge to compatibly without introducing data errors.

For the cases where the signals are latched and sampled on opposite edges of the clock signal the algorithm will assure accurate sampling of data because the signals depicted in FIGS. 4 and 5 will be shifted by half of a clock signal which will not change the results.

The invention has now been described with reference to the preferred embodiments. Alternatives and substitutions will now be apparent to persons of skill in the art. For example, although the embodiments have been described in the context of the SPI bus, the invention is applicable to any synchronous serial bus protocol that can be implemented using signal latching and sampling on different edges of a clock signal.

Accordingly, it is not intended to limit the invention except as provided by the appended claims.

What is claimed is:

1. A method for synchronously transferring serial data between a transmitter and a receiver comprising:
   providing a clock signal having rising and falling edges;
   latching data at the transmitter on a selected edge of a clock signal;
   transmitting each bit of data twice on first and second successive clock cycles;
   sampling each bit of data at the receiver on the selected edge of the clock signal; and
   discarding data sampled on the selected edge of the first successive clock cycle if the selected edge of the clock signal is the rising edge or discarding data sampled on the selected edge of the second successive clock cycle if the selected edge of the clock signal is the falling edge.

2. A system for synchronously transferring serial data between a transmitter and a receiver comprising:
   a transmitter that latches data on a selected edge of a clock signal with the clock signal having rising edges and falling edges and that transmits each bit of data twice on first and second successive clock cycles; and
   a receiver that samples each bit of data on the selected edge of the clock signal and discards data sampled on the selected edge of the first successive clock cycle if the selected edge of the clock signal is the rising edge or discards data sampled on the selected edge of the second successive clock cycle if the selected edge of the clock signal is the falling edge.

3. A receiver for use in a system for synchronously transferring serial data between a transmitter and a receiver, the receiver comprising:
   an input port for sampling a data stream that includes duplicates of each bit of data at first and second successive clock cycles of a clock signal having rising and falling edges; and
   a controller that discards data sampled on the selected edge of the first successive clock cycle if the selected edge of the clock signal is the rising edge or discarding data sampled on the selected edge of the second successive cycle signal if the selected edge of the clock signal is the falling edge.

4. A system for synchronously transferring serial data between a transmitter and a receiver comprising:
   means for providing a clock signal having rising and falling edges;
   means for latching data at the transmitter on a selected edge of a clock signal;
   means for transmitting each bit of data twice on first and second selected clock cycles;
   means for sampling each bit of data at the receiver on the selected edge of the clock signal; and
   means for discarding data sampled on the selected edge of the first successive clock cycle if the selected edge of the clock signal is the rising edge or discarding data sampled on the selected edge of the second successive clock cycle if the selected edge of the clock signal is the falling edge.

* * * * *